United States Patent Office 2,793,156
Patented May 21, 1957

2,793,156

REPOSITORY PENICILLIN PRODUCTS

Benjamin Kerwin Souler, Syracuse, N. Y., assignor to Bristol Laboratories Inc., Syracuse, N. Y., a corporation of New York No Drawing. Application August 17, 1950, Serial No. 180,078

3 Claims. (Cl. 167—65)

The present invention relates to a stable aqueous suspension of a penicillin and is more particularly concerned with a stable aqueous suspension of a penicillin containing polyvinyl pyrrolidone.

The water-instability of penicillin compounds, including inorganic and organic salts, is well known in the pharmaceutical art. For this reason, aqueous suspensions of such salts, and, in particular, stable aqueous suspensions of penicillins have not been known and have previously been considered an impossibility. As a consequence, the medical profession has been limited to the employment of penicillin-peanut oil compositions and aluminum monostearate-oil-penicillin suspensions, and, when such are not indicated for the particular case, have been faced with the necessity of preparing their own aqueous suspension of penicillin by mixing sterile water or saline solution with dry preparations available from the pharmaceutical trade. This has, of course, been a great inconvenience to the medical profession, and, even when prepared in the office of the practicing physician, such aqueous suspensions are of utility only for periods not exceeding ten days, according to recent Food and Drug regulations. Although some aqueous suspensions of penicillin have been proposed previously, these have had all the expected disadvantages of an inferior shelf-life, usually considerably less than two weeks. These aqueous penicillin preparations also have an added disadvantage in that the penicillin does not remain in suspension but tends to settle out. Prolonged shaking is necessary to resuspend the penicillin and even then a uniform dosage is not assured. It is obvious that a stable suspension of penicillin, retaining its original therapeutic activity, and therefore having utility over long periods, is highly desirable from a commercial standpoint, and much needed by the medical profession.

It is an object of this invention to provide stable aqueous suspensions of penicillin or penicillin salts, etc.

Another object is to provide such a stable suspension of penicillin which contains polyvinyl pyrrolidone as a suspending agent.

A further object of the invention is the provision of a sterile aqueous suspension of penicillin, which is stable over long periods of time, and is therefore of increased therapeutic efficacy and importance.

Other objects of the invention will become apparent hereinafter.

The objects of the present invention have been accomplished, and an aqueous suspension of penicillin which is stable over long periods of time obtained by providing an aqueous suspension containing a therapeutically effective form of penicillin with polyvinyl pyrrolidone as a suspending agent.

The amount of the suspending agent will vary to a certain extent, but usually from one to 15 percent and preferably from two to 10 percent, is employed, and variations within these ranges may be made by an experienced chemist or pharmacist with regard for the intended use of the composition.

The final penicillin suspension may have a potency of anywhere from 10,000 to 800,000 units per milliliter. Ordinarily, a suspension of penicillin having a potency of 30,000–600,000 units per milliliter is considered optimum and found to be entirely satisfactory. The potency of the penicillin is not to be construed as a limiting factor, and the various activities are merely mentioned to indicate that penicillins of varying activity are suitable for incorporation into the composition of the present invention, again with regard for the intended application of the aqueous suspension.

The composition is not limited to the exact ingredients previously described and to the exclusion of all others, since various other ingredients, while not necessary, may be added if desired. For instance, sodium citrate, sodium phosphates, sodium carboxymethyl cellulose, procaine salts, a small amount of preservative, such as Phenol U. S. P., cresol, U. S. P., Methyl Paraban (methyl ester of p-hydroxybenzoic acid) may be employed. A small amount of wetting agent, such as Tween 20, Tween 40, Tween 60, Tween 80, or Tween 85 may also be added. A small quantity of a vasoconstrictor may be considered an advantageous addition, and, whatever additional ingredients are employed, the total amount should ordinarily not exceed more than about five percent by weight, and preferably not more than 10 percent by weight, of the composition.

The method of the present invention comprises suspending the prescribed amount of penicillin compound in sterile distilled water or physiological saline, adding the polyvinyl pyrrolidone thereto with stirring (aforementioned other agents may or may not be added). The volume is then adjusted by addition of the requisite amount of water to bring the concentration of ingredients within the required range. The admixture is, of course, conducted under sterile conditions, and all solids introduced are in a finely divided or powdered form, preferably below 100 microns in diameter and usually below 50 microns in diameter.

The following examples are given for purposes of illustration only, and are not to be construed as limited.

PROCESS FOR THE PREPARATION OF LECITHIN COATED PROCAINE PENICILLIN

Chopped procaine penicillin G is passed through a Fitzmill with a #100 mesh screen and then screened through a #250 mesh screen. The procaine penicillin is then coated with a 33⅓ percent (weight/volume) lecithin-chloroform solution by slowly adding the solution to the procaine penicillin in a McLellan Blendor while rotating. The coated procaine penicillin is passed through a hammer mill with a cyclone separator and free air intake (all the residual chloroform should be evaporated off during this step). The coated procaine penicillin should contain not less than 1.0% and not more than 1.5% lecithin.

This lecithin coated procaine penicillin was used in the following examples.

*Example 1.—Formula*

Lecithin coated procaine penicillin (30% micronized, 70% chopped)_____grams\_\_ 13.2
Aqueous solution, 2% polyvinyl pyrrolidone, 1% sodium citerate _____cc\_\_ 7.1

The polyvinyl pyrrolidone-citrate solution was added to the lecithin coated procaine penicillin (which had previously been passed through a #200 mesh screen) in a beaker and incorporated using a glass rod. A complete and uniform mixture was effected using a mechanical stirrer. The suspension was immediately transferred to a 20 cc. glass syringe fitted with #13 gauge needle and 1 cc. glass cartridges filled, thus avoiding any loss of moisture by evaporation.

Original assay _____ u./cc__ 560,100
Loss after 2 months at 37° C_____percent__ 0

*Example 2.—Formula*

Procaine penicillin—lecithin coated, passed through
  #200 mesh screen_____grams__ 13.2
Aqueous solution, 5% polyvinyl pyrrolidone, 1%
  sodium citrate_____cc__ 7.1
Procedure: Same as for Example 1.
Original assay_____u./cc__ 482,000
Loss after 2 months at 37° C_____percent__ 1.3

*Example 3.—Formula*

Lecithin coated procaine penicillin passed through
  a #200 mesh screen_____grams__ 26.4
Aqueous solution, 2% polyvinyl pyrrolidone, 0.5%
  sodium citrate, 0.286% methylparaben—auto-
  claved at 15 lbs./15 min_____cc__ 14.2
Procedure: Same as for Example 1.
Original assay _____u./cc__ 677,000
Loss after 2 months at 37° C_____percent__ 0

All of the above examples were easily and completely injectable through a #20 gauge needle into rabbit muscle.

*Example 4.—Formula*

Lecithin coated procaine penicillin mixture—30%
  micronized, 70%—#200 mesh_____grams__ 66
Aqueous solution, 2% polyvinyl pyrrolidone, 1% so-
  dium citrate, 0.2% methylparaben—autoclaved at
  15 lbs./15 min_____cc__ 36

The procedure for manufacture was the same as in Example 1 except that the batch was passed through a colloid mill after stirring 1 or 2 minutes with a mechanical stirrer, then filled into cartridges from a 20 cc. glass syringe fitted with a #13 needle.

Original assay_____u./cc__ 639,000
Loss after 2 months at 37° C_____percent__ 0

*Example 5.—Formula*

Lecithin coated procaine penicillin (30% micro-
  nized, 70% chopped)_____grams__ 16.5
Aqueous solution, 2% polyvinyl pyrrolidone, 1%
  sodium citrate, 0.2% methyl paraben, 0.1%
  Tween 40_____cc__ 9.0
Procedure: Same as for Example 1.
Original assay _____u./cc__ 650,400
Loss after 1 month at 37° C_____percent__ 6.6

*Example 6.—Formula*

Lecithin coated procaine penicillin (30% micro-
  nized, 70% chopped)_____grams__ 33.0
Procaine phosphate_____do____ 1.0
Aqueous solution, 2% polyvinyl pyrrolidone, 1%
  sodium citrate, 0.2% methyl paraben autoclaved
  at 15 lbs./15 min_____cc__ 18.0

Procedure: Same as for Example 1 except that the procaine phosphate was dissolved in a portion of the aqueous solution (5 cc.) just prior to incorporating the balance of the ingredients.

Original assay_____u./cc__ 682,200
Loss after 1 month at 37° C_____percent__ 14.4

It is to be understood that the invention is not to be limited to the exact details of operation or exact compositions shown and described, as obvious modifications and equivalents will be apparent to one skilled in the art, and the invention is therefore limited only by the scope of the appended claims.

I claim:

1. A sterile aqueous suspension of lecithin-coated procaine penicillin containing one to two percent of polyvinyl pyrrolidone.

2. An aqueous suspension of procaine penicillin having at least 300,000 units of procaine penicillin per milliliter of suspension, lecithin in the range of from about 0.7% to about 1.5%, and about 0.6% polyvinylpyrrolidone, the percentages being based on weight per volume of suspension.

3. A sterile aqueous suspension of procaine penicillin comprising at least 300,000 units of procaine penicillin per milliliter of suspension, said procaine penicillin being coated with lecithin in the amount of from 1.0 to 1.5 percent of its own weight, and about 0.6 to 1.7 percent by weight of the suspension of polyvinylpyrrolidone.

References Cited in the file of this patent

UNITED STATES PATENTS

| | | |
|---|---|---|
| 2,467,583 | Cosar | Apr. 19, 1949 |
| 2,474,729 | Durel | June 28, 1949 |
| 2,515,898 | Rhodehamel | July 18, 1950 |
| 2,619,447 | Malcolm | Nov. 25, 1952 |
| 2,637,679 | Gaunt | May 5, 1953 |
| 2,656,299 | Elias | Oct. 20, 1953 |

OTHER REFERENCES

Janot: "Les Penicillines a Action Prolongee," Anns. Pharm. Francs., January 1950, pp. 46–61, esp. pp. 57 and 58.

Squibb's Abstract Bull., Sept. 7, 1949, page 1034.

Neuroth et al.: "Penicillin Ointments and Creams," Amer. Jour. Pharm., October 1946, pp. 363 and 364.

Hahn: "Stabilisation of Penicillin Solutions with Sodium Citrate," The Lancet, March 29, 1947, pp. 408–410.

Murat: "Etude de Certaines Proprietes Chimiques et Pharmacodynamiques de la Polyvinylpyrrolidone," Produits Pharmaceutiques, August 1949, vol. 4, No. 8, pp. 350–356, and September 1949, vol. 4, No. 9, pp. 397–403.

Schweizerische Apotheker-Zeitung, vol. 85, No. 47, November 22, 1947, pp. 949 and 950.